United States Patent [19]

Friedrich et al.

[11] 4,152,188

[45] May 1, 1979

[54] METHOD AND APPARATUS FOR MANUFACTURE OF LAMINATED GLAZING

[75] Inventors: Hans-Georg Friedrich, Wuerselen; Friedrich Halberschmidt, Merkstein; Rudolf Pelzer, Herzogenrath, all of Fed. Rep. of Germany

[73] Assignee: Saint-Gobain Industries, Neuilly-sur-Seine, France

[21] Appl. No.: 767,021

[22] Filed: Feb. 9, 1977

Related U.S. Application Data

[60] Division of Ser. No. 694,449, Jun. 9, 1976, abandoned, which is a continuation of Ser. No. 471,753, May 20, 1974, abandoned.

[30] Foreign Application Priority Data

May 25, 1973 [FR] France .............................. 73.19035

[51] Int. Cl.² ..................... C03C 27/00; B32B 17/00
[52] U.S. Cl. ................................. 156/212; 156/285; 156/286; 156/306; 156/382
[58] Field of Search ................ 156/99, 102, 103, 104, 156/105, 106, 285, 286, 306, 382, 214, 323, 212; 264/278

[56] References Cited

U.S. PATENT DOCUMENTS

| | | | |
|---|---|---|---|
| 2,361,348 | 10/1944 | Dickson et al. | 264/278 |
| 3,026,232 | 3/1962 | Finch | 156/285 |
| 3,214,958 | 11/1965 | Muller et al. | 72/427 |
| 3,228,330 | 1/1966 | Myers | 156/382 |
| 3,322,598 | 5/1967 | Marks et al. | 156/382 |
| 3,546,740 | 12/1970 | Johnson | 264/314 |
| 3,554,834 | 1/1971 | Bennett et al. | 156/285 |
| 3,556,315 | 1/1971 | Berger | 294/110 |
| 3,729,358 | 4/1973 | Barefoot | 425/390 |
| 3,769,133 | 10/1973 | Halberschmidt et al. | 156/104 |
| 3,933,562 | 1/1976 | Cruckshank et al. | 156/285 |
| 3,951,724 | 4/1976 | Johnson et al. | 156/382 |
| 3,964,958 | 6/1976 | Johnston | 156/285 |

*Primary Examiner*—Michael W. Ball
*Attorney, Agent, or Firm*—John T. Synnestvedt; M. Richard Page

[57] ABSTRACT

A plastic sheet is laminated to a glass sheet for the manufacture of laminated safety glass by means of an elastic membrane rigidly held at its periphery and subjected to increasing gas pressure, the membrane thereby pressing the plastic sheet against the glass sheet progressively from the center out toward the edges of the latter.

23 Claims, 6 Drawing Figures

METHOD AND APPARATUS FOR MANUFACTURE OF LAMINATED GLAZING

This is a division of application Ser. No. 694,449 filed June 9, 1976, now abandoned, which is in turn a continuation of Ser. No. 471,753 filed May 20, 1974, now abandoned.

The present invention pertains to a process and apparatus for the manufacture of laminated safety glass comprising a simple or composite sheet of glass and a sheet of plastic material adhered to an exterior face of the glass sheet.

According to a known process for the manufacture of laminated safety glass of this type, the sheet of glass and the sheet of plastic material to be joined are superposed, optionally with an adhesive coating or layer between them. For processing purposes only there is then placed on the free face of the plastic sheet a protective or guard sheet of glass having the shape which the safety glass being made is to possess. This three-element assembly is then subjected to the usual treatment for the fabrication of laminated glass by action of heat and pressure in an autoclave, and the guard sheet is thereafter separated from the finished laminate, which comprises a single or composite sheet of glass and a plastic sheet adhered to an exterior face of that simple or composite glass sheet. While the laminate may be plane, i.e. flat, it may be non-plane, with simple or compound curvature, as in the case of windshields, rear windows or the side glass of motor cars. Prior art processes of this character are described in the published German applications for patent Nos. 2,055,361 and 2,161,217, and in Belgian Pat. No. 788,868.

In such known processes, it is hence necessary to utilize a guard sheet whose shape must correspond exactly to that of the glass sheet of the laminate being manufactured. It is then necessary to have available guard sheets of closely controlled shapes and dimensions and also to perform the manipulative steps for application of the guard sheet to the unfinished laminate and for its removal from the finished laminate.

The invention provides a process for the manufacture of laminated safety glass having on one exterior face a sheet of plastic, which process dispenses with the guard sheet in the bonding of that sheet of plastic to the remainder of the laminate and which produces laminated safety glass of high optical quality such as is necessary for the windshields of motor vehicles. The process of the invention moreover makes it possible to produce such laminated glass having curvature either of one direction or of two opposite directions.

In accordance with the invention the sheet of plastic, optionally coated with an adhesive, is pressed against the glass sheet with the help of a membrane made of a highly stretchable or extensible material, such as rubber, firmly held at its periphery and subjected to the action of a fluid under pressure. The periphery of the membrane is held at a fixed distance from the edge of the glass. In consequence of this, as the membrane bulges or stretches progressively into three-dimensional curvature with the gradual application of fluid pressure, it presses against the plastic sheet and presses the latter against the glass, first in the central region thereof, and then progressively out to the edges of the glass.

By means of the process of the invention laminated safety glass with an exterior plastic sheet can be produced of high optical quality. An advantage of the process of the invention resides in the fact that the plastic sheet is pressed first against the center of the glass sheet and then progressively over the entire surface thereof in a regular fashion. The surface of the plastic sheet is thus applied progressively against the glass. The result is a smooth and substantially perfect lamination of the glass and plastic sheets together.

In a presently preferred form of practice of the invention, the glass sheet is held horizontally and the plastic sheet is pressed by the elastic membrane against the lower face of the glass.

It is desirable to degas the assembly under vacuum before laminating the glass and plastic sheets together, in order to eliminate gas or air bubbles between the two. During the degassing operation, if the face of the membrane away from the laminate being formed is subjected to atmospheric pressure, the vacuum employed for degassing will bulge the membrane against the plastic sheet so that an initial portion of the pressing or laminating step will be carried out. It may however be preferable to carry out the degassing without applying to the plastic and glass sheets any pressure tending to laminate the two together. To this end, the vacuum or partial vacuum for degassing may be provided on both sides of the membrane. When the desired degree of vacuum has been obtained between the glass and plastic sheets to be laminated together, the process of laminating or pressing can begin. It may be begun by re-establishing atmospheric or supra-atmospheric pressure on the side of the membrane away from the plastic sheet.

The process may be carried out by employing a plastic sheet previously coated with a layer of adhesive on the face thereof which is to contact the glass. It is also possible however to employ a separate adhesive foil interposed between the glass and plastic sheets.

It is also possible to use for the plastic sheet a material which is self-adhesive to the glass when in the plastic state, without the employment of any further adhesives. The present invention is especially advantageous in the manufacture of laminated safety glass of the type described in German application No. P 22,28 299.

In one mode of carrying out the process of the invention, there are employed for the plastic sheet (and for the adhesive, if a separate one is used), materials which can be activated by heat. The pressing thereof against the glass sheet is then carried out at elevated temperature. For example, it is possible to preheat the glass sheet to the temperature necessary to obtain activation of the plastic and adhesion thereof to the glass, pressing of the plastic sheet to the preheated glass being then carried out in an enclosure which is either at ambient temperature or at a temperature which need be only slightly higher than ambient.

During the pressing of the plastic sheet against the glass the latter is advantageously buttressed or backed up on the side thereof away from the plastic sheet by a rigid form corresponding to the shape of the glass sheet itself. In this practice of the invention, it is of course necessary to possess such a form for every shape of window to be manufactured. According to a variant of the process of the invention, the glass is supported during the pressing step with the help of a second highly elastic membrane which is disposed on the side of the glass away from the plastic sheet and against which a pressure is exerted equal to that which is to be exerted on the membrane which is to press against the plastic sheet.

The invention also provides apparatus suitable for practice of the process thereof. According to one feature thereof, this apparatus comprises a two-part container or receiver which can be tightly closed, means to support the sheet of glass in a substantially horizontal position and means to support within the container and beneath the glass and at a certain distance therefrom an elastic membrane which extends over the entire cross-section of the container and which is fixed at its periphery. The apparatus further includes means to exhaust air from the container and means to maintain a supra-atmospheric pressure below the lower surface of the membrane.

BRIEF DESCRIPTION OF THE DRAWINGS

The invention will now be further described in terms of a number of presently preferred modes of practice thereof, and in terms of a number of presently preferred exemplary embodiments of the apparatus thereof, all with respect to the accompanying drawings, in which.

DESCRIPTION OF PREFERRED MODES OF THE PROCESS AND OF PREFERRED EMBODIMENTS OF THE APPARATUS OF THE INVENTION

Figure 1:
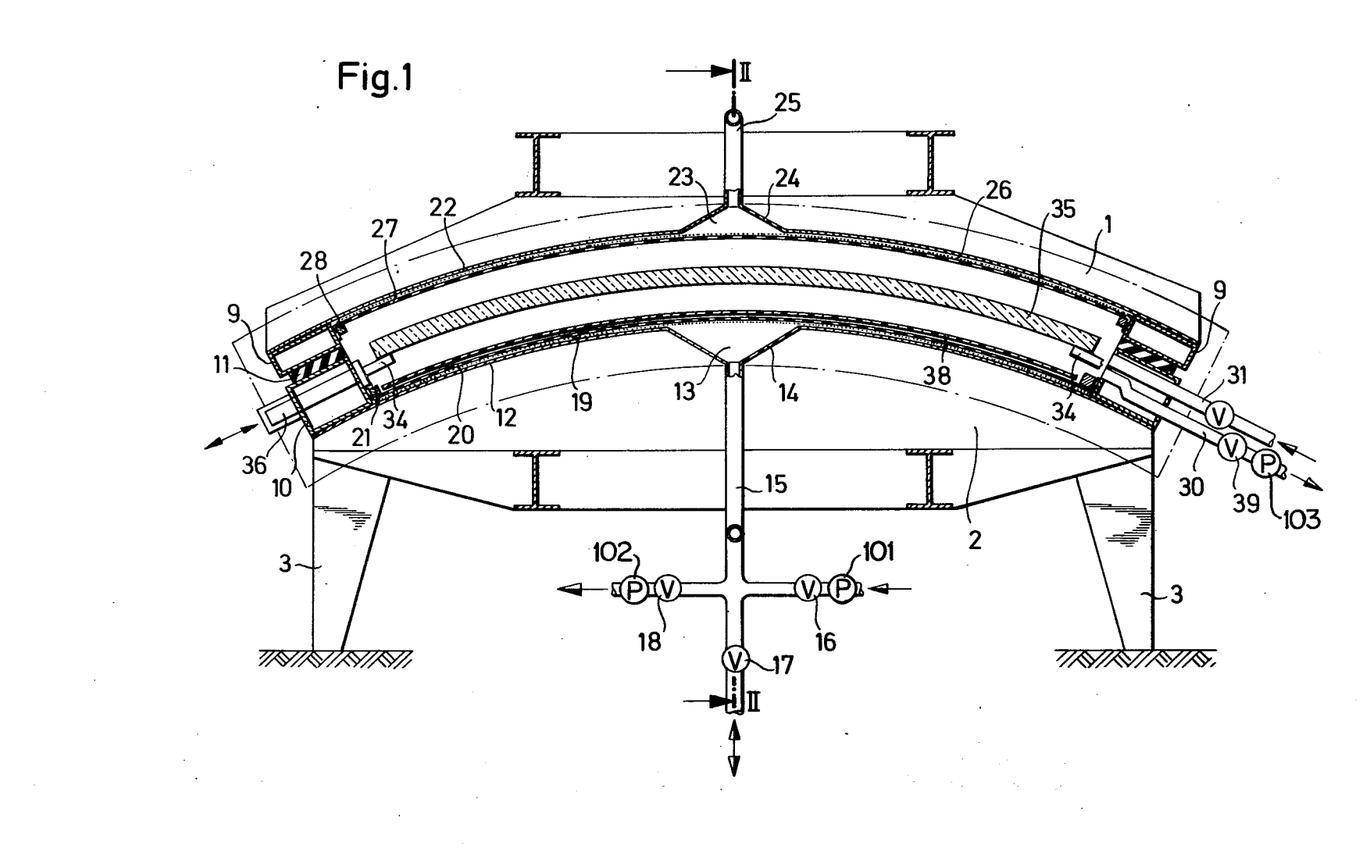
FIG. 1 is a vertical sectional view through one form of apparatus according to the invention suitable for practice of the process of the invention.
Figure 2:
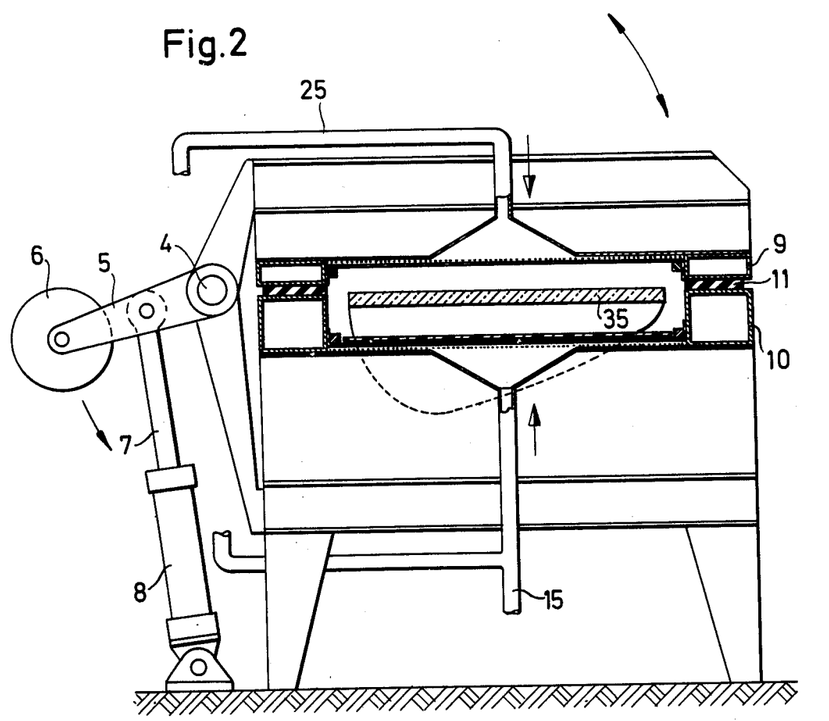
FIG. 2 is a sectional view taken on the line II—II of FIG. 1.

The container illustrated in FIG. 1 comprises upper and lower halves 1 and 2. The two halves of the container and consequently the container itself exhibit a shape which approximates that of the laminated glass to be manufactured. Consequently, the internal volume of the container is small and the container is evacuated or can be evacuated in a short period of time. The lower half 2 rests on feet 3. The upper half 1 is joined to the lower half 2 at a pivoting bearing or hinge 4 (FIG. 2). The arm 5 of this hinge is fixed to the upper half 1. At the end of the arm 5 there is provided a counterweight 6. The arm 5 is subjected to the action of a rod 7 coupled to the piston of a hydraulic cylinder 8, by means of which the container can be opened or closed, the upper half pivoting about the axis of the bearing 4.

The upper half 1 of the container possesses around the periphery of the cover 22 thereof a downwardly extending sidewall 9, advantageously of box-like cross-section as shown, and the lower half 2 presents a corresponding upwardly extending sidewall 10. On the upper edge of the lower sidewall there is provided a gasket or sealing lip 11 of elastic material which is compressed between the sidewalls when the two halves of the container are joined so as to close the container in an airtight fashion for the maintenance of a vacuum or of supra-atmospheric pressure within it.

The bottom or floor 12 of the lower half 2, from which the wall 10 extends upwardly, includes an enlargement or sump 13 having conical walls 14 leading to a conduit 15. The conduit 15 may be coupled through valves 16, 17 and 18 (FIG. 1) to pipes leading to a source of supra-atmospheric pressure such as a pump 101, to the atmosphere, and to a source of vacuum such as a pump 102 respectively. A metallic cloth 19 of fine mesh is disposed over the bottom of the lower half and is covered with a membrane 20 of silicone rubber having a thickness which may be of the order of 2 millimeters. The membrane 20 is firmly held along its entire periphery between the bottom 12 and an annular frame or clamping member 21. The metallic cloth 19 may for example be of brass, and it holds the membrane 20 a short distance above the bottom 12 so as to prevent the membrane from being drawn into the conical portion 14 when the container is subjected to a vacuum.

The upper half 1 of the container is of similar construction. The cover 22 likewise possesses in the central portion thereof an enlargement 23 with conical walls 24, connecting to a conduit 25. The conduit 25 is connected to the conduit 15 and may therefore be subjected to supra-atmospheric pressure, to the atmosphere or to a sub-atmospheric pressure by operation of valves 16, 17 and 18. There thus exists within the conduit 25 the same pressure as in the conduit 15. Beneath the cover 22 there is likewise provided a metallic fabric 26 of fine mesh which serves as a spacer for the membrane 27 of silicone rubber. The membrane 27 is, like the membrane 20, bound at its edge between annular clamp 28 and the cover 22.

The space within the container and between the membranes 20 and 27 may be subjected to sub-atmospheric or to atmospheric pressure via conduits 30 and 31 which pass through the sidewall 10.

Retractable struts 34 are provided the lower half of the container which extend toward the interior from the sidewall and which serve as supports for the glass sheet 35. These struts are coupled to the pistons of hydraulic cylinders such as the cylinder 36, and may therefore be retracted by action of those cylinders.

Figure 3:
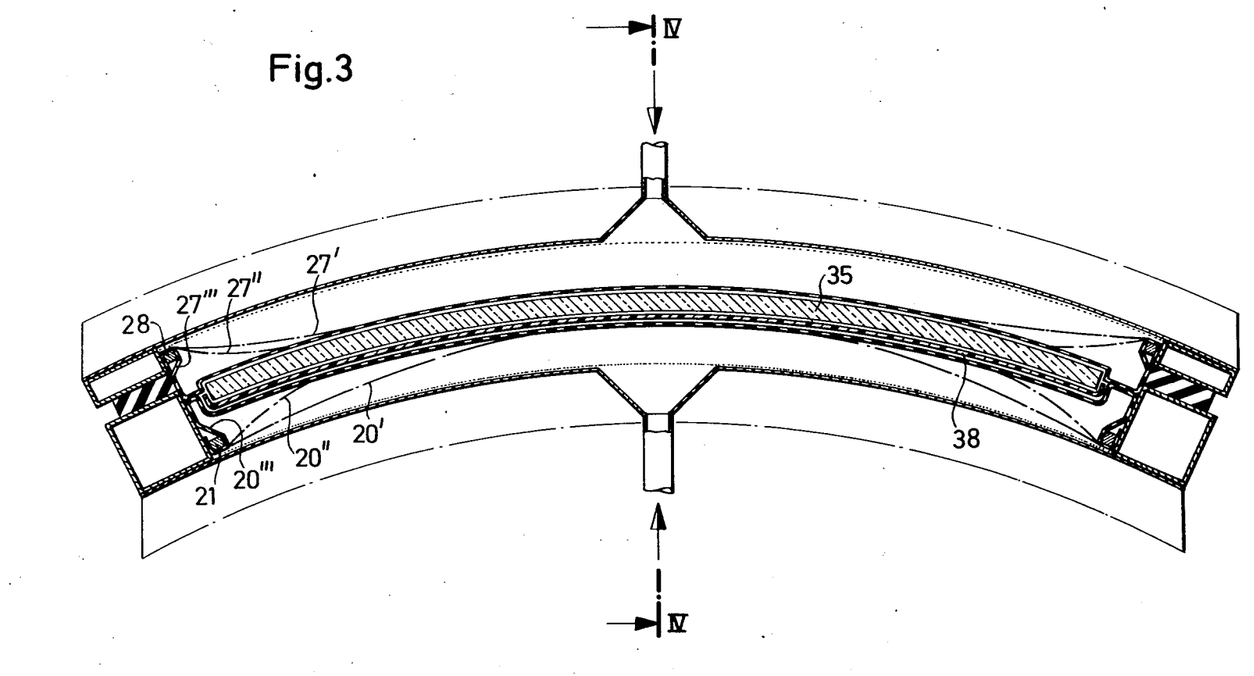
FIG. 3 is a fragmentary view similar to that of FIG. 1, on which have been schematically indicated three successive stages or phases in the process of the invention.
Figure 4:
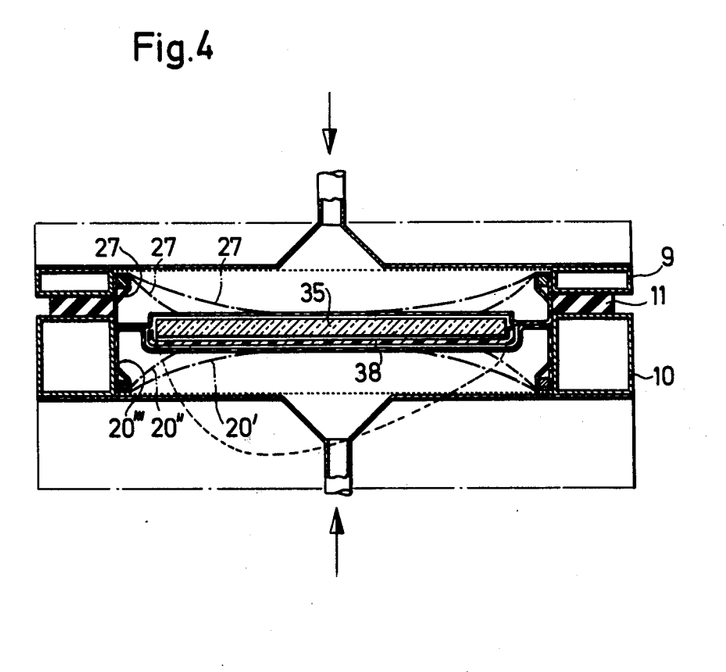
FIG. 4 is a section taken on the line IV—IV of FIG. 3.

To produce a laminate the container is first opened by action of the cylinder 8 to pivot the upper half 1 of the container upwardly. A plastic sheet 38 is then placed in the lower half of the container, it being the upper face of this sheet which is to come in contact with the glass. This upper surface may optionally be coated with an adhesive material activated by heat. Thereafter the sheet of glass 35 is set down on the struts 34, the glass having been previously heated in a suitable oven to a temperature suitable for activation of the adhesive. The container is then closed by operation of the cylinder 8, to produce between the membranes 20 and 27 an airtight enclosure containing the glass sheet 35 and the plastic sheet 38. Valve 18 is thereafter opened, and via conduits 15 and 25 the pressure outside this enclosure, i.e., in the spaces 13 and 23 between the membranes 20 and 27 and the bottom 12 and the top 22 of the container respectively, is reduced to a suitable low value, which may be for example of the order of one-half millimeter of mercury. This reduction in pressure outside the enclosure is carried out in order to prevent premature squeezing together of the glass and plastic sheets by the membranes during evacuation of the enclosure. Evacuation of these spaces outside the enclosure may be carried out before the container is closed. After the container has been closed and after the pressure in these spaces has been suitably lowered, the valve 39 is opened, the valve in line 31 being closed. This connects the conduit 30 to a vacuum pump 103 so as to exhaust the interior of the container, i.e., the enclosure within which the sheets 35 and 38 are disposed. After a time, which may be of the order of one minute, a pressure of about half a millimeter of mercury is obtained in the interior of the container. As soon as this degree of vacuum has been reached, the valve 18 is closed and the valve 17 is slightly opened. This slowly re-establishes atmospheric pressure outside the membranes 20 and 27. As indicated in FIGS. 3 and 4, with growing pressure outside the membranes 20 and 27, the membranes are pressed firstly, and substantially simultaneously as between the two, against the center area of the plastic and glass sheets. The valve 39 being open to connect the conduit 30 to the source of vacuum, air remaining within the shrinking volume of the enclosure between the membranes flows out through conduit 30, and the pressure in that enclosure remains at about half a millimeter of mercury. Thus the lower membrane 20 will stretch a little faster than the upper membrane, lifting the center portion of the plastic sheet into contact with the glass. The weight of the glass on the struts 34 is thereby reduced, and these are then withdrawn by operation of their hydraulic cylinders, as soon as the glass 35 is supported by the lower membrane.

The condition of the membrane 20, at the time when it presses the center portion of the plastic sheet 38 against the glass sheet 35, is indicated by the dash line 20' in FIG. 3, whereas the condition of the upper membrane 27 at the same instant is shown by the dash line 27'. Gradually with inflation or deformation of the membranes due to the difference in air pressure on the two sides thereof, the limit of their contact with the glass and plastic sheets, and therefore the limit of the area over which those two sheets have been pressed together, moves outward from the center toward the edges of those sheets. In view of the fact that the two membranes are steadily and simultaneously inflated at the same rate, the glass is held in the central position shown in FIG. 3. In consequence of the progressive increase of the surface thereof in contact with the lower membrane 20, the plastic sheet 38 is laminated against the glass sheet 35 and is radially smoothed against the surface thereof. Two subsequent phases of the deformation of the membranes 20 and 27 are shown in FIGS. 3 and 4 at the dash lines bearing those reference characters, doubly and triply primed. By virtue of intimate contact with the hot glass sheet, the heat sensitive adhesive coating on the plastic sheet, or alternatively the plastic sheet itself, becomes plasticized and thus insures adhesion of the plastic sheet to the glass. When atmospheric pressure has been re-established outside the membranes, i.e., in the spaces 13 and 23, the valve 17 is closed and air under pressure is introduced through the valve 16 until a pressure of approximately two atmospheres is applied to the laminate. This further improves the pressing and adhesion between the two sheets. The pressure of two atmospheres is maintained for some 20 seconds, for example. Thereafter the valve 17 is opened, and atmospheric pressure is re-established in the enclosure between the membranes by closing valve 39 and by opening the valve in line 31. The container is then finally opened by operation of the cylinder 8. The finished glass and plastic laminate rests under its own weight on the lower membrane 20 and may thereupon be removed from the container.

Figure 5:
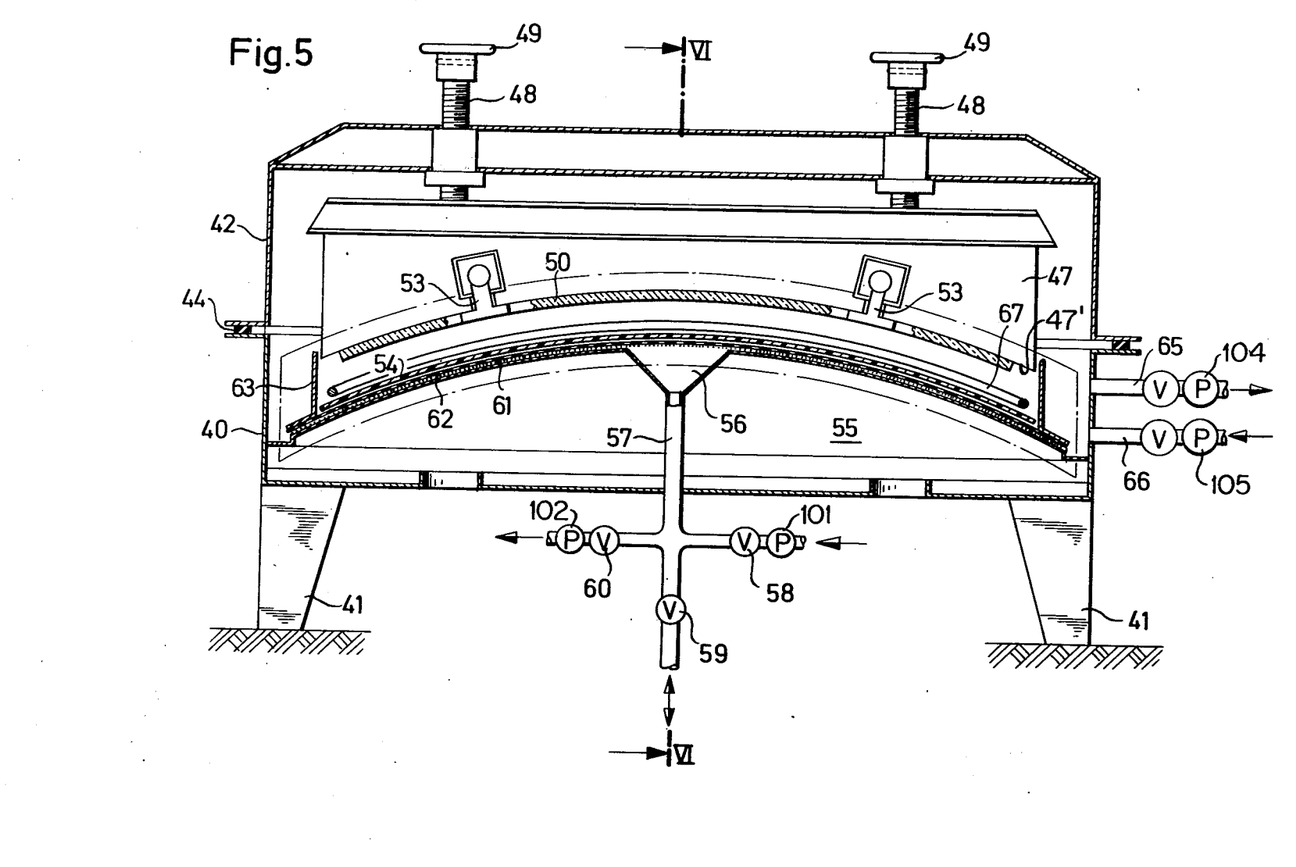
FIG. 5 is a vertical sectional view illustrating a second form of apparatus in accordance with the invention.
Figure 6:
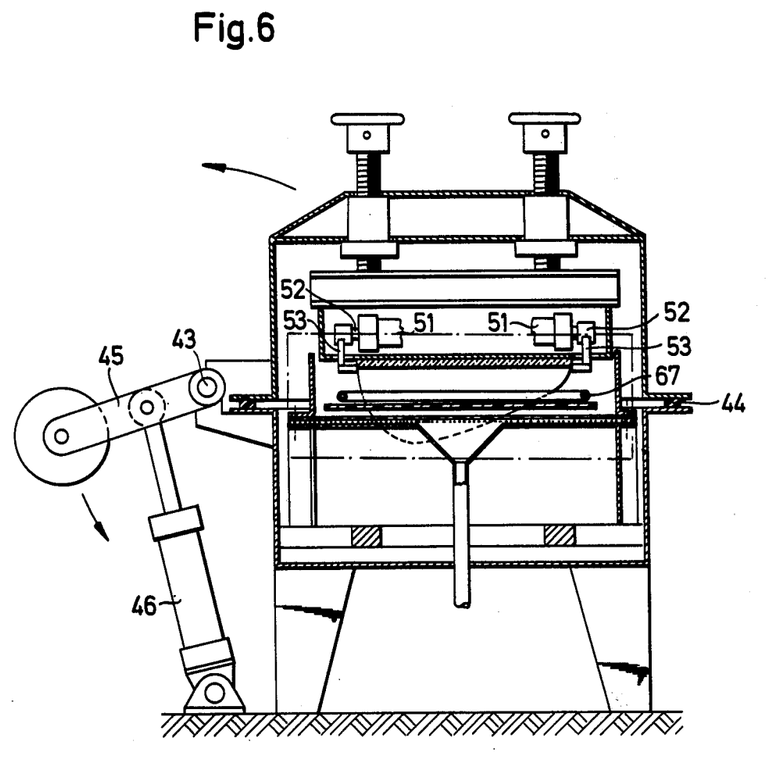
FIG. 6 is a sectional view taken on the line VI—VI of FIG. 5.

FIGS. 5 and 6 show another embodiment of the apparatus of the invention for practice of the method thereof. This apparatus similarly possesses a lower container half 40 resting on feet 41 and an upper container half or cover 42. The cover 42 may pivot about the hinge 43 (FIG. 6) which is supported in the lower half 40. A gasket 44 insures a vacuum and pressure-tight closure between the two halves of the container. The hydraulic cylinder 46 coupled to the arm 45 serves to open and close the container.

The cover 42 includes a rigid form 47 fixed to the cover by threaded rods 48. The form 47 is provided with a surface 47' conforming to the surface which the finished laminate, and more particularly the exterior face of the glass in the finished laminate, is to possess. Advantageously, e.g., in the case of windshields, this is a concave surface. By adjustment of hand wheels 49 it is possible to rotate these rods and to adjust the height of the rigid form 47 inside the cover, as may be necessary when one form 47 is to be replaced with another or different shape.

The concave surface of this form corresponds exactly to that of the sheet of glass 50 with which it is to come in contact. When the apparatus is loaded for performance of a laminating operation, the glass sheet 50 is fixed to this form by a pneumatically operated clamp. This clamp comprises pneumatic cylinders 51 (FIG. 6) whose operating pistons 52 carry fingers 53 protruding downwardly and which engage the edges of the glass sheet 50. The lower surface of the glass sheet 50 is thereby left free for engagement against the plastic sheet, indicated at 54, which is to be laminated with it.

In the lower half 40 of the container there is provided a convex mating or counterform 55. At its center form 55 possesses a conical opening 56 coupled with a conduit 57. The conduit 57 can be subjected to supra-atmospheric pressure, to the atmosphere or to sub-atmospheric pressure by operation of the valves 58, 59 and 60 respectively. On the convex surface of the form 55 there is disposed a metallic fabric 61 of fine mesh. Above this fabric is disposed a highly elastic and stretchable membrane 62 of silicone rubber which may have a thickness of the order of 2 millimeters and which is held at its periphery against the form 55 by means of an annular clamp 63. The clamp 63 possesses a vertical flange which, when the container halves are closed as indicated in FIG. 5, extends above the lower edge of the form 47. The clearance between this flange and the vertical sidewalls of the form 47 is made small enough to prevent expulsion of the membrane 62 through that clearance when the pressure below the membrane rises above the pressure above it. Evacuation and the establishment of supra-atmospheric pressure within the closed container and above the membrane 62 are effected through the valved lines 65 and 66 respectively with the help of pumps 104 and 105.

In certain cases, when the plastic sheet 54 is very soft, it may be advantageous to rest on it an annular weight or frame 67. This frame corresponds approximately to the shape of the glass sheet 50 but is somewhat larger so that the glass sheet may pass through it. The frame is of massive metal and rests freely on the plastic sheet 54. Its function is to hold the latter down at its periphery while the central portion thereof is being raised against the glass sheet 50 by operation of the membrane 62. There is thus obtained a supplementary tension on the plastic sheet which hinders the formation of undesirable creases in that sheet.

The frame 67 may be fastened to the cover 42 in such fashion that when the container is closed it will automatically be applied against the plastic sheet. Such a frame may also be provided in the apparatus of FIGS. 1 and 2.

The difference between the apparatus of FIG. 4 and that of FIGS. 5 and 6 resides essentially in the fact that in the latter there is employed only a single membrane to press and to adhere the plastic sheet against the glass sheet, which is held in a rigid form. The process of adhering the plastic sheet 54 to the glass sheet 50 is in every respect the same as that hereinabove described.

The invention thus provides a process for laminating together a plurality of sheets in which the sheets are supported in juxtaposition between two abutments at least one of which includes an extensible membrane, and in which fluid pressure is applied against the side of that membrane away from the sheets. The sheet adjacent that membrane is desirably a flexible one, and the periphery of the membrane is desirably held in fixed position. According to the process of the invention an adhesive may be applied to one of the adjacent faces of the sheets being laminated. Desirably, in the process of the invention, the abutments are superposed one above the other with the abutment including a flexible membrane below the other abutment and with the sheets supported substantially horizontally between the abutment and with the flexible sheet below the other sheet. According to another feature of the process of the invention, the pressure between the sheets is reduced to a level below atmospheric prior to application of pressure to the outside of the membrane. Desirably however the pressure is reduced below atmospheric on both sides of the membrane before the pressure applying step, which may be performed by raising the pressure on the side of the membrane away from the sheets.

One of the abutments may be rigid, but both may be flexible membranes, and fluid pressure may then be applied against the sides of both of the membranes away from the sheets. When one of the sheets is stiff and the other is flexible, the sheets are supported for lamination together with the flexible sheet adjacent the abutment including the membrane, if only one abutment includes a membrane.

According to a further feature of the process to the invention, the periphery of the flexible sheet is releasably restrained during the pressure applying step. When one of the sheets is stiff, support for the stiff sheet may be withdrawn after initiation of the pressure applying step.

From another aspect, the process of laminating a flexible sheet to a second sheet according to the invention comprises enclosing the sheets in an evacuable chamber having a flexible, extensible wall, e.g., as provided by a membrane, reducing the pressure in the chamber below atmospheric, and thereafter applying to the side of the extensible wall remote from the chamber a supra-atmospheric pressure. Especially when one of the sheets being laminated is a sheet of glass, it may be heated prior to introduction into the evacuable chamber. Whether or not the glass sheet is so heated, the plastic sheet and glass sheet are desirably pressed together at a central area thereof, and are thereafter pressed together over an area simultaneously increasing radially outwardly in all directions from that central area toward the edges of the sheets.

The invention also provides apparatus for laminating sheets which comprises means to support a sheet, an elastic membrane, means to hold the periphery of the membrane in fixed position adjacent the support means, and means to apply a fluid under pressure to the side of the membrane remote from the support means. The support means may be the retractable pins of FIG. 1, or the clamps of FIG. 5, or they may be merely the abutment, fixed or yielding, against which one of the sheets bears during the progressive process of lamination, such pins and clamps being dispensed with. The apparatus of the invention for laminating sheets may also be defined as comprising means defining a closable container, an abutment within the container for retraint of a sheet, conduit means through which the pressure within the container may be reduced below atmospheric, a flexible and extensible membrane supported within the container adjacent the abutment, means to hold the periphery of the membrane against a wall of the container, and conduit means through which fluid pressure between the membrane and wall may be controlled. The abutment may be fixed, as in the case of the abutment 47 of FIG. 2, and the apparatus may further include means such as the flange 63 surrounding that abutment with close clearance to limit extension of the membrane under pressure applied to the side thereof away from said abutment.

From another point of view, the apparatus of the invention for laminating a flexible sheet to a stiff sheet comprises a closable container (e.g., the space between the membranes 20 and 27 of FIG. 1 and between the membrane 62 and the inside of cover 42 in FIG. 5), abutment means within the container against which the stiff sheet can be stressed, an elastic membrane disposed adjacent the abutment and having its periphery affixed to a wall of the container whereby the membrane defines a boundary surface of the container. This is the case in both of the embodiments illustrated. The apparatus then further comprises means defining, as at 13 in FIG. 1 and 55 in FIG. 5, a closed chamber bounded in part by the face of the membrane opposite the face thereof exposed to the container, and means such as the lines 15, 30 and 31 of FIG. 1 and 57, 65 and 66 of FIG. 5, to control independently the pressures within the container and chamber.

While the invention has been described hereinabove in terms of a number of presently preferred exemplary embodiments thereof, the invention itself is not limited thereto but rather comprehends all modifications of and departures from those embodiments properly falling within the spirit and scope of the appended claims.

We claim:

1. A method of laminating a flexible sheet to a surface of a member comprising:
   freely placing the flexible sheet on an extensible membrane, with the peripheral edges of the flexible sheet being free to be moved upwardly by the membrane;
   supporting the member spaced above the extensible membrane with said surface for receiving the flexible sheet facing said flexible sheet;
   then extending the membrane to lift first a central portion of the flexible sheet toward said surface of the member and press said central portion onto said surface and thereafter progressively press the sheet onto the surface radially outwardly from said central portion of the sheet.

2. A method as in claim 1 wherein the member is peripherally supported before the membrane is extended.

3. A method as in claim 1 wherein, while the flexible sheet is pressed onto said surface of the member, the member is engaged by a second extensible membrane on a second surface opposite to the first-mentioned surface, the membrane first contacting a central portion of the second surface and thereafter extending progressively radially outwardly.

4. A method as in claim 3 wherein the second extensible membrane is extended by fluid pressure.

5. A method as in claim 4 wherein the extensible membranes engage the member substantially simultaneously.

6. A method as in claim 5 wherein the second membrane engages a central portion of the second surface and the membranes are extended radially outwardly at substantially the same rate.

7. A method as in claim 3 wherein the member is initially peripherally supported and wherein the peripheral support for the member is removed as the membranes extend toward the peripheral edges of the member and the member is supported by the extensible membranes.

8. A method as in claim 1 wherein the member is a transparent sheet.

9. A method as in claim 8 wherein said surface of the transparent sheet onto which the flexible sheet is pressed is concave.

10. A method as in claim 1 wherein an adhesive is disposed between the flexible sheet and said surface of the member.

11. A method of laminating a flexible sheet to a member comprising:
freely supporting the member within a gas-evacuable enclosure, with a first surface thereof facing downwardly;
supporting the flexible sheet on an extensible membrane mounted in the enclosure and spaced from said one surface of the member, with the peripheral edges of the sheet being free to be moved by the membrane;
evacuating the space between the surface and the extensible membrane while maintaining the membrane spaced from said first surface;
then establishing a pressure differential between the side of the membrane facing said first surface and the side of the membrane remote from the surface whereby the membrane first lifts the central portion of the flexible sheet into engagement with a portion of the surface and thereafter progressively presses the sheet outwardly onto the first surface.

12. A method as in claim 11 wherein the member is supported in the enclosure with said first surface substantially horizontally disposed.

13. A method as in claim 11 wherein a second extensible membrane engages a second surface of the member remote from said first surface while the sheet is applied to said first surface.

14. A method as in claim 13 wherein a pressure differential is established between said second surface of the member and said second membrane to cause said second membrane to engage progressively said second surface of the member.

15. A method as in claim 13 wherein, during the pressing of the flexbile sheet onto said first surface, the member is supported between the first and second membranes.

16. A method as in claim 11 wherein said first surface of the member is concave.

17. A method as in claim 11 wherein the member is a light-transmitting sheet and the flexible sheet is light-transmitting.

18. A method as in claim 11 wherein the member is an automotive windshield and the flexible sheet is transparent.

19. A method as in claim 11 including the step of releasably restraining the periphery of the flexible sheet as it is pressed onto the first surface.

20. A method for laminating a plastic sheet to a surface of a rigid glass sheet comprising:
freely placing the plastic sheet on an extensible membrane with the peripheral edges thereof being free to be moved upwardly by the membrane;
supporting the glass sheet spaced above the extensible membrane with the surface to receive the plastic sheet facing said plastic sheet;
then extending the membrane to lift first a central portion of the plastic sheet toward said surface of the glass sheet and press said central portion onto said surface and thereafter progressively press the plastic sheet onto said surface of the glass sheet radially outwardly from said central portion of the sheet.

21. A method as in claim 20 wherein said surface of the glass sheet is concave.

22. A method of laminating a flexible sheet to a surface of a member comprising:
placing the flexible sheet freely on an extensible membrane, with the peripheral edges of the flexible sheet being free to be moved by the membrane;
peripherally supporting the member spaced above the extensible membrane with said surface for receiving the flexible sheet facing said flexible sheet;
then extending the membrane to lift first a central portion of the flexible sheet toward said surface of the member and press said central portion onto said surface and thereafter progressively press the sheet onto the surface radially outwardly from said central portion of the sheet and removing the peripheral support for the member as the membrane extends near the periphery of the member and the member is supported by the extensible membrane.

23. A method of laminating a flexible sheet to a member comprising:
peripherally supporting the member within a gas-evacuable enclosure, with a first surface thereof facing downwardly;
supporting the flexible sheet on an extensible membrane mounted in the enclosure and spaced from said one surface of the member, with the peripheral edges of the sheet being free to be moved by the membrane;
evacuating the space between the surface and the extensible membrane while maintaining the membrane spaced from said first surface;
then establishing a pressure differential between the side of the membrane facing said first surface and the side of the membrane remote from the surface whereby the membrane first lifts the central portion of the flexible sheet into engagement with a portion of the surface and thereafter progressively presses the sheet outwardly onto the first surface; and
removing the peripheral support for the member as the extensible membrane extends near the periphery of the member and the member is supported by the membrane.

* * * * *